3,319,294
APPARATUS FOR EXPANDING AND CURING STRIP MATERIALS
Herbert H. Borsvold, Orange, and Paul H. Haack, Seymour, Conn., assignors to The B. F. Goodrich Company, New York, N.Y., a corporation of New York
Filed Dec. 6, 1965, Ser. No. 511,906
2 Claims. (Cl. 18—6)

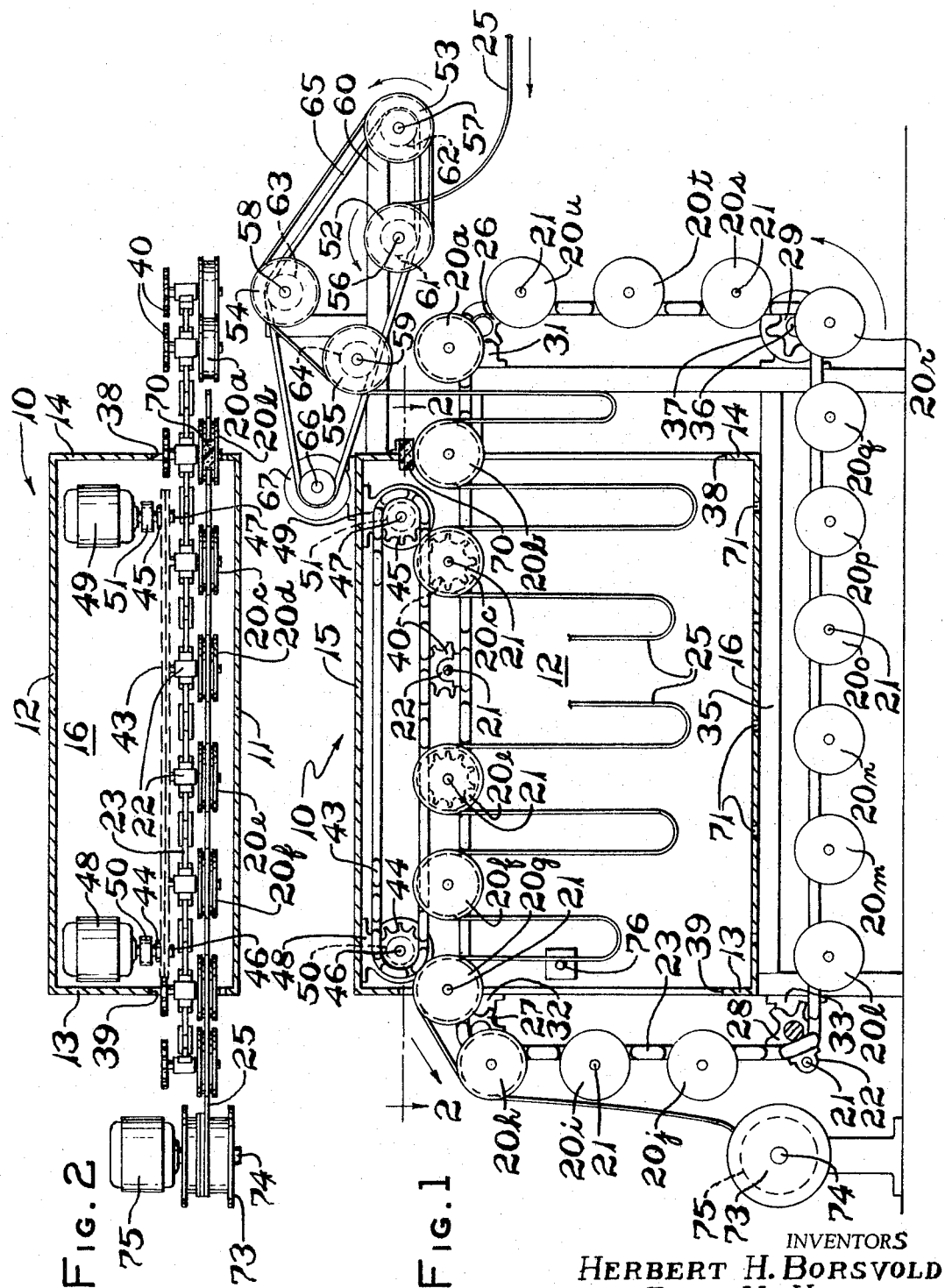

The present invention pertains to apparatus for expanding, or expanding and curing, or expanding, curing and normalizing, or merely normalizing a continuous linear strip of flexible rubber or rubber-like material without distorting its cross-sectional shape.

In the manufacture of continuous lengths of flexible cellular rubber or rubber-like strip material, it is highly desirable in processing the strip material to be able to expand and cure the material without distorting its cross-sectional shape. Customarily, the strip material is expanded and cured while it is held in a supported state by a non-yielding supporting surface, for example, while being carried on a conveyor belt. Due to the frictional engagement between the non-yielding supporting surface and the supported surface of the strip material, however, the strip material is unable to expand uniformly in all directions because of the natural force of gravity which holds the strip material against the non-yielding conveying surface. As a result, the shape of the strip material is distorted longitudinally, as well as transversely, i.e., cross-sectionally.

In the manufacture of continuous lengths of flexible rubber or rubber-like strip material (whether it is of a cellular structure or not), it also is desirable to "normalize" the strip material in order to relieve any internal stresses that have been developed in the strip material during its manufacture. Freshly extruded rubber stock, either in a blown or unblown state, after curing, contains stresses which cause the rubber stock to shrink in size until the stresses are relieved. Desirably, all of the aforesaid shrinking stresses in the rubber or rubber-like strip material should be relieved completely before the strip material is cut into lengths. The normalizing procedure involves heating the rubber strip material at a proper temperature until the shrinking stresses are relieved. Heretofore, normalizing of rubber or rubber-like strip material has been done while the strip material has been supported on a non-yielding conveyor surface. However, due to the frictional engagement between the supporting surface and the supported surface of the strip material, the strip material could not contract uniformly in all directions and distortion resulted.

The present invention provides apparatus which can be used to expand, or to expand and cure, or to expand, cure and normalize, or to cure and normalize, or to merely normalize a continuous, flexible strip of rubber or rubber-like material without causing distortion of the strip material. In accordance with this invention the strip material during expansion and/or cure and/or normalization is conveyed through the apparatus in a substantially unsupported state and thereby is allowed to expand or contract, as the case may be, freely in all directions. The material is maintained in a substantially unsupported state by festooning the material between wheels of the apparatus which wheels are conveyed through a heating zone while being rotated first in one direction and then in a reverse direction. The only period of time that a segment of the strip material is in a supported state is when it actually is supported on said wheels, but this time period is only momentarily.

The rubber or rubber-like strip material generally is formed by extrusion and may have various cross-sectional shapes. For example, the cross-sectional shape may be square, rectangular, circular, oval, or may be a complex shape such as is found in automobile door weather stripping or in refrigerator door gaskets. The strip material may be made of any of the flexible rubber or rubber-like compounds. The finish strip material may have a cellular structure or may be non-cellular.

The strip material as a finished product is used, for example, as tubing, hose, gaskets, molding strips, and vehicle weather stripping.

The invention will be fully understood by referring to the following detailed description of a specific embodiment of this invention and to the drawing in which:

FIG. 1 is a side elevational view in section of apparatus within the scope of this invention; and FIG. 2 is a section taken along line 2—2 of FIG. 1.

Referring to the drawings, the apparatus comprises basically a thermal-insulated hot-air oven 10 through which is driven a sprocket chain 23 which has thereon a series of rotatably-mounted spaced wheels 20a through 20u for carrying strip material 25 through hot-air oven 10 after it has been deposited on and looped between adjacent wheels of said series of wheels 20a through 20u to form festoons of said strip material 25.

The hot-air oven 10 comprises a front wall 11, a back wall 12, a pair of opposed end walls 13, 14, a top wall 15 and a floor 16. All of said walls contain thermal-insulating material so that the hot-air oven 10 will have a low heat loss.

Wheels 20a through 20u are mounted on shafts 21 which are journalled in brackets 22 which are all attached in spaced relation to sprocket chain 23. The peripheries of wheels 20a through 20u each has a depressed surface on which said strip material 25 is supported.

Sprocket chain 23 is driven through a generally rectangular path in a vertical plane over sprockets 26, 27, 28 and 29. Sprockets 26, 27 and 28 are mounted on brackets 31, 32 and 33, respectively. Brackets 31 and 33 are attached to frame 35 while bracket 32 is attached to hot-air oven 10. The sprocket chain 23 is driven by sprocket 29 which is mounted on shaft 36 of motor 37. Sprocket chain 23 travels, starting from sprocket 29, first upwardly to sprocket 26, then horizontally through hot-air oven 10, entering through slit-like opening 38 in side wall 14 and existing through slit-like opening 39 in side wall 13, then over sprocket 27 downwardly outside hot-air oven 10 to sprocket 28 and then finally beneath hot-air oven 10 to sprocket 29.

As the series of rotatable wheels 20a through 20u travels through hot-air oven 10 on sprocket chain 23, they are rotated, alternately, first in one direction and then in the opposite direction, through the rotation of sprockets 40 which are mounted on shafts 21 on which said series of rotatable wheels 20a through 22u also are mounted.

Sprockets 40 are rotated, alternately, first in one direction and then in the opposite direction when they engage a wheel rotation assembly which comprises a sprocket chain 43 which is mounted between a pair of spaced sprockets 44 and 45 which are mounted on shafts 46 and 47, respectively. Shafts 46 and 47 are driven by motors 48 and 49, respectively, through clutches 50 and 51, respectively.

Sprocket chain 43 is run alternately first in one direction for a selected period of time and then in the opposite direction at the same speed and for the same period of time. Specifically, sprocket chain 43 is run in one direction by engaging clutch 50 while clutch 51 is disengaged. Thereby, motor 48, through shaft 46, on which clutch 50 is mounted, turns sprocket 44 in a desired direction which, in turn, turns sprocket chain 43 in that direction.

Sprocket chain 43 is run in the opposite direction by engaging clutch 51 while clutch 50 is disengaged, which will cause motor 49 through shaft 47, on which clutch 51 is mounted, to turn sprocket 45 in the opposite direction from which sprocket 44 turns which in turn will cause sprocket 45 to turn in the opposite direction. Clutch 50 and 51 can be of the electrically operated type and can be engaged and disengaged alternately for desired lengths of time by a simple electrical timer. The aforesaid electrical timing apparatus is well known and can be easily assembled by those skilled in the art.

Driven delivery wheels 52, 53, 54 and 55 are rotatably mounted on shafts 56, 57, 58 and 59, respectively, which are connected to frame 60. Shafts 56, 57, 58 and 59 are provided with shieves 61, 62, 63 and 64 which are rotated by belt 65 which is driven by shieve 66 of motor 67. Delivery wheels 52, 53, 54 and 55 all lie in a vertical plane common with the vertical plane which the series of wheels 20a though 20u lie.

To operate the apparatus embodied herein, it is necessary before starting said apparatus to thread strip material 25 by hand around delivery wheel 52, in the manner illustrated in FIG. 1, and then around delivery wheels 53, 54 and 55. Next, strip material 25 is looped between the two adjacent wheels of series of wheels 20a through 20u that are about to enter hot-air oven 10 and which also are moving in a horizontal rather than a vertical plane to form a festoon of strip material. According to FIG. 1 strip material 25 would be looped between wheels 20a and 20b. Finally, strip material 25 is taken over the wheel of said adjacent wheels that is next about to enter hot-air oven 10, and then hung downward toward floor 16. According to FIG. 1 this wheel would be wheel 20b.

After the preliminary operation of treading strip material 25, hot-air oven 10 is heated to the desired temperature by introducing hot air through openings 71 in floor 16.

Next, motor 37 which provides the power to drive sprocket chain 23 and motor 67 which provides the power to turn delivery wheels 52, 53, 54 and 55 are started and run at a preselected speed.

With motors 37 and 67 running, strip material 25 will automatically loop between the adjacent wheels of series of wheels 20a through 20u that lie in a horizontal plane and are about to enter hot-air oven 10 through slit-like opening 38 in said wall 14.

This loop formation can be best understood by referring to wheels 20a and 20u in FIG. 1 where a partially formed loop is illustrated. Assuming motors 37 and 67 are running, this loop of strip material 25 will continue to grow in length downward between wheels 20a and 20b until wheel 20a, which is being carried toward hot-air oven 10 crosses the path of strip material 25 as it was being delivered downward from wheel 55. After wheel 20a has crossed the path of strip material 25 and as it continues toward hot-air oven 10, strip material 10 will fall around the leading top quadrant of wheel 20a. As wheel 21a moves under block 70, strip material 25 will strike block 70 and will proceed to wrap around the trailing top quadrant of wheel 20a, and then fall downward to form another festoon of the strip material between wheel 20a and 20u. As the apparatus embodied herein is run, the aforedescribed loop formation will be repeated between subsequent adjacent wheels. Thus, festoons of strip material 25 will be formed between wheels 20u and 20t and 20s and 20r, etc.

The depth of the festoons of strip material 25 between adjacent wheels can be increased by increasing the speed of motor 67 and/or decreasing the speed of motor 37 and the depth of said festoons can be decreased by decreasing the speed of motor 67 and/or increasing the speed of motor 37. Preferably, the depth of said festoons is controlled by varying the speed of motor 67, since to vary the speed of motor 37 may adversely increase or decrease the dwell time of strip material 25 in hot-air oven 10.

As the series of wheels 20a through 20u travels through hot-air oven 10 they are rotated alternately first in one direction for a period of time and then in the other for the same period of time, by the wheel rotation mechanism previously described. In FIG. 1 and FIG. 2, wheels 20c, 20d, 20e and 20f are undergoing this rotation. By the alternate rotation of the wheels of said series of wheels 20a through 20u while they are in hot-air oven 10, the strip material 25 during its dwell in hot-air oven 10 is in a substantially unsupported state.

As the wheels of said series of wheels 20a through 20u leave hot-air oven 10 through slit-like opening 39 in side wall 13, the strip material that is looped between the exiting wheel and the following wheel (according to FIG. 1 and FIG. 2 these wheels are wheels 20g and 20f, respectively) is removed by the winding action of reel 73 which by the winding action of reel 73 which is mounted on shaft 74 of motor 75 which is actuated for running a pre-selected length of time by trip switch 76 which is tripped when it is hit by a festoon of strip material 25.

It will be appreciated that any given segment of strip material 25 during its dwell time in hot-air oven 10 will have actual contact and thus be in a supported state with a wheel of the series of wheels 20a through 20u only for a very short period of time, if at all, thus as a result the strip material 25 during its dwell in hot-air oven 10 can expand or contract freely in all directions without the cross-sectional shape of said strip-material 25 being objectionably distorted.

Although in the apparatus embodied herein, the series of wheels 20a through 20u are shown to be single wheels which can carry but one single length of strip material, it will be understood that two or more sets of wheels can be mounted side by side on shafts 21 so that two or more lengths of strip material can be carried through hot-air oven 10 in the manner previously described simultaneously if so desired.

As aforestated, the apparatus may be used for merely expanding the strip material (any subsequent operations, such as curing, being performed in other apparatus), or for expanding and curing the strip material, and/or for normalizing the strip material.

Normally, a longer dwell time in hot-air oven 10 is required if the strip material is to be expanded into a cellular structure, cured and normalized than if the strip material is only expanded and/or cured or just normalized.

We claim:
1. Apparatus for heating flexible continuous lengths of strip material in an essentially unsupported condition which apparatus comprises
  (a) a heating chamber through which said flexible continuous lengths of strip material are advanced,
  (b) a series of rotatably-mounted wheels having depressed peripheral surfaces for carrying a flexible continuous length of strip material,
  (c) carrier means for advancing said series of rotatably mounted wheels in spaced-apart relationship through the upper portion of said heating chamber with said flexible continuous lengths of strip material looped between adjacent wheels of said series of rotatably mounted wheels,
  (d) means for driving said carrier means,
  (e) means for rotating said series of rotatably mounted wheels, alternately first in one direction and then in the other direction as said wheels are carried through the upper portion of said heating chamber on said carrier means,
  (f) means for depositing said flexible continuous lengths of strip material on and looping it between adjacent wheels of said series of rotatably mounted wheels before said adjacent wheels enter said heating chamber,
  (g) means for pulling said looped flexible continuous lengths of strip material from between adjacent wheels of said series of rotatably mounted wheels as said adjacent wheels emerge from said heating chamber, and (h) means for heating the interior of said heating chamber.

2. The apparatus of claim 1 wherein said means for rotating said series of rotatably mounted wheels comprises a series of sprockets which are associated with said series of rotatably mounted wheels, a sprocket being associated with each wheel of said series, a sprocket chain mounted within said heating chamber between a pair of spaced sprockets and positioned so as to engage said series of sprockets during their dwell in said heating chamber each of said pair of spaced sprockets being rotated by a motor through a clutch whereby the said sprocket chain can be driven first in one direction for a selected time and then in the opposite direction for an equal period of time.

References Cited by the Examiner

UNITED STATES PATENTS

| | | | |
|---|---|---|---|
| 1,411,706 | 4/1922 | Bulley | 18—6 X |
| 1,762,243 | 6/1930 | Rosener. | |
| 1,973,059 | 9/1934 | Gerke | 18—2 X |
| 2,423,147 | 7/1947 | Hinman | 18—22 X |
| 3,024,492 | 3/1962 | Antonlino | 18—6 X |
| 3,242,528 | 3/1966 | Elder | 18—6 |
| 3,277,525 | 10/1966 | Buschman et al. | 18—6 |

WILLIAM J. STEPHENSON, *Primary Examiner.*

UNITED STATES PATENT OFFICE
CERTIFICATE OF CORRECTION

Patent No. 3,319,294                                            May 16, 1967

Herbert H. Borsvold et al.

It is hereby certified that error appears in the above numbered patent requiring correction and that the said Letters Patent should read as corrected below.

Column 2, line 45, for "existing" read -- exiting --; line 48, before "to" insert -- back --; column 3, line 66, for "wheels 20u and 20t and 20s and 20r, etc." read -- wheels 20u and 20t, 20t and 20s, 20s and 20r, etc. --.

Signed and sealed this 28th day of November 1967.

(SEAL)
Attest:

Edward M. Fletcher, Jr.                                      EDWARD J. BRENNER

Attesting Officer                                                Commissioner of Patents